Sept. 27, 1966 N. P. PARKINSON 3,275,961
WIPER LIFT ENCODERS
Filed Jan. 11, 1965
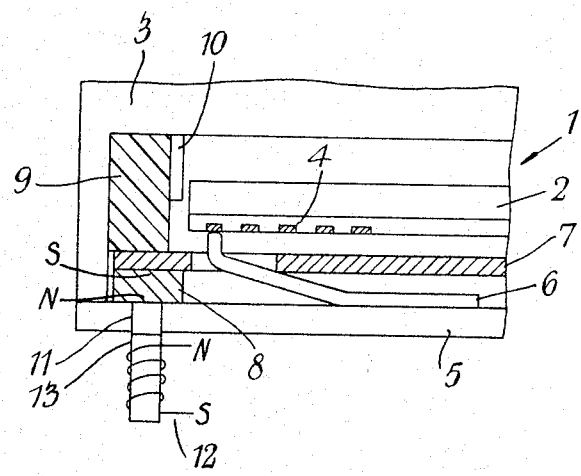
INVENTOR:-
Noel Percival Parkinson
By Alexander Howell
attorneys

United States Patent Office 3,275,961
Patented Sept. 27, 1966

3,275,961
WIPER LIFT ENCODERS
Noel Percival Parkinson, Wembley, England, assignor to Moore Reed and Company Limited
Filed Jan. 11, 1965, Ser. No. 424,523
Claims priority, application Great Britain, Jan. 17, 1964, 2,279/64
10 Claims. (Cl. 335—106)

The invention relates to digital encoders and more specifically to such encoders having moving contacts which are sensed by wiping contacts.

To enable contact encoders to compete favourably with non-contacting encoders such as those using optical or magnetic sensing, it is necessary for the contacts to be durable and for the disc carrying the moving contacts to be rotatable with low torque. To ensure satisfactory performance, however, it is essential that there be adequate pressure between the movable contacts and the wipers, which tends to involve a high torque requirement for rotating the disc.

Accordingly, it is an object of the invention to provide an encoder in which the contacts and wipers can be disengaged when the encoder is not being read. The invention takes advantage of the fact that an encoder is seldom read continuously but is more frequently used on a shared-time basis with other encoders or signal sources.

The invention accordingly provides a digital encoder having a rotatable disc, contacts disposed on the disc, and wipers for sensing the contacts, the wipers being selectively movable into and out of engagement with the disc.

The movement of the contacts can conveniently be effected electromagnetically. Resilient means can be employed to urge the wipers out of engagement, the electromagnetic force then being used to overcome this means.

The invention can be more readily understood and carried into effect from the following description of an illustrative embodiment thereof, reference being made to the accompanying drawing. The drawing shows partly in section and partly diagrammatically an encoder according to the present invention.

As shown in the drawing, a contact encoder 1 comprises a disc 2 rotatably mounted on bearings (not shown) in a supporting framework 3. The disc 2 carrying contacts 4 which are arranged in any suitable coded angular disposition, for example, in accordance with a known binary code or Gray code.

On a wiper block 5, attached to the framework 3, are mounted wipers 6 for electrically sensing the contacts 4. The wipers 6 are in the form of elongated spring members extending generally radially of the disc 2 through apertures in an electrically insulating plate 7 located between the wiper block 5 and the disc. The free ends of the wipers by which they engage the contacts 4 are suitably tipped with an electrically conductive material, for example, platinum, which may be harder or softer than the materials of the wiper and the contacts, depending on electrical performance requirements.

A permanent magnet ring 8, magnetized in the axial direction, is attached to the face of the insulating plate 7 adjacent the wiper block 5, and a resilient ring 9 is positioned between the other face of the insulating plate and the framework 3. The ring 9 is retained in place by a shield 10 which is itself attached to the framework 3. The resilient ring 9 is of any suitable material, for example, a synthetic or natural rubber, or a synthetic plastics material.

An annular pole piece 11 is mounted in conjunction with the wiper block 5 so as to be located close to the permanent magnet ring 8. Conveniently the annular pole piece 11 projects through an aperture provided in the wiper block 5 so as to contact the magnet ring 8.

The arrangement of the parts so far described is such that a gap of several thousandths of an inch exists between the wipers 6 and the contacts 4 on the disc 2, the wipers being held back from the disc by an abutment of the insulating disc 7 against the wipers at a point between the sensing tips of the wipers and the fixed ends, by which they are mounted on the wiper block 5. The resilient ring 9 is so dimensioned that in this position, which is its position of greatest relaxation, it is under compression. The resilient ring 9 thus serves to urge the wipers 6 away from the disc 2 by applying a slight force on the insulating plate 7.

Engagement of the sensing tips of the wipers 6 with the contacts 4 is effected electromagnetically. A suitable means is shown diagrammatically in the drawing as a coil for energising a core 13. The core 13 and coil 12 are positioned on the side of the wiper block 5 remote from the magnet ring, the magnet core 13 being in contact with the pole piece 11. On energisation of the electromagnet assembly constituted by the coil 12 and core 13, the pole piece 11 is magnetised with a predetermined polarity.

The operation of the encoder 1 is described below:

On transmission of a pulse indicating that a reading of the encoder is required for example, by computer using the encoder as an input source, the coil 12 is energised. The consequent predetermined polarity of the coil 13 is such that the ends in contact with the pole piece 11 has induced in it a magnetic field of a like polarity with that of the nearer end of the magnet ring 8. This creates a repulsive force between the two and because the pole piece 11 is not readily movable causes movements of the ring 8. The insulating plate 7 is carried with the ring 8. The repulsion between the pole piece 11 and the ring 8 is initially effected at a high rate but as the distance between the opposed faces of the pole piece and the ring increases, the repulsive force decreases; thus the rate of travel of the insulating plate also decreases. The movement of the plate 7 involves further compression of the resilient ring 9 the stiffness of which progressively increases, providing increasing resistance to compression. As a result the rate of travel of the insulating plate 7 is further decreased until a balance rest condition is reached. Thus, the wipers 6 initially move quickly towards the disc 2 but thereafter move more slowly, the sensing tips being gently deposited on the face of the disc. The wipers 6 remain in contact with the disc 2 for as long as the coil 12 is energised and are withdrawn by the resilience of the ring 9 when current no longer flows through the coil.

It will be appreciated that the contacts are subjected to wear only when the wipers 6 are in engagement with the disc 2 and that increased driving torque requirements occur only during this time. These increased driving torque requirements can conveniently be met by the provision of any suitable driving arrangement for the disc which provides sufficient momentum, for example, a flywheel.

It will be evident to those skilled in the art that the invention can be embodied in a variety of different ways within the following claims.

What I claim is:
1. A digital encoder comprising an electrical contact support element, a plurality of electrical contacts disposed on said support element, a wiper for sensing engagement with said contacts, one of said support element and wiper being movable relative to the other for successive sensing operation, a housing member of fixed disposition relative to the encoder, resilient compression means operably located between said housing member and one of said element and wiper urging the latter component in a first direction transverse to the direction of support element-wiper movement to hold said wiper and contacts normally out of sensing engagement, and sensing control means selectively operable to compress said resilient compression means in a second direction opposite to said first direction to effect sensing engagement between said wiper and contacts.

2. A digital encoder according to claim 1 wherein said resilient compression means is operably located between said housing member and said wiper, and comprising further resilient means urging the wiper into sensing engagement with said contacts but with less force than that of said resilient compression means when holding the same normally out of sensing engagement.

3. A digital encoder according to claim 2 comprising a wiper support member, and an electrically insulating member, and wherein said wiper comprises a fixed wiper end portion secured to said wiper support member, a free wiper end portion for sensing engagement with said contacts, and a spring wiper portion as said further resilient means intermediate said fixed and free wiper end portions urging the last such portion towards said sensing engagement, and said insulating member is operably located between said resilient compression means and said sprung wiper portion.

4. A digital encoder according to claim 3 wherein said support member is a rotatable disc located between said housing and wiper support members with said first and second directions being opposite axial directions relative to said disc, and said resilient compression means is an annular block of elastomeric material disposed around and spaced from the periphery of said disc.

5. A digital encoder according to claim 4 wherein said insulating member is a plate located between and spaced from both said disc and support members, said plate being apertured with said wiper free end portion passing therethrough and said sprung wiper portion in engagement with the periphery of the aperture.

6. A digital encoder according to claim 5 wherein said annular block is directly engaged between said housing and insulating members.

7. A digital encoder according to claim 6 wherein said sensing control means comprises an annular magnetic member located between said insulating and wiper support members in opposition to said annular block, an annular pole piece fixably located adjacent said magnetic member, and electromagnet means selectively energisable to magnetise said pole piece to repel said magnetic member and compress said annular block.

8. A digital encoder according to claim 7 wherein said housing member comprises an annular recess in which said annular block is seated.

9. A digital encoder according to claim 1 wherein said resilient compression means comprises an elastomeric material in block form.

10. A digital encoder according to claim 1 wherein said sensing control means comprises a magnetic member operably coupled with said resilient compression means, a pole piece located adjacent said magnetic member, and an electrical winding selectively energisable to magnetise said pole piece to move said magnetic member by magnetic force and compress said resilient compression means.

References Cited by the Examiner
UNITED STATES PATENTS

| | | | |
|---|---|---|---|
| 1,977,707 | 10/1934 | Weitzer | 200—7 |
| 3,153,163 | 10/1964 | Foldes et al. | 200—166 X |

BERNARD A. GILHEANY, *Primary Examiner*

J. J. BAKER, *Assistant Examiner.*